United States Patent [19]
den Toonder

[11] 4,447,828
[45] May 8, 1984

[54] PHASE CHANGE DYNAMIC SCRAMBLING

[75] Inventor: Pieter den Toonder, Dordrecht, Netherlands

[73] Assignee: Oak Industries Inc., Rancho Bernardo, Calif.

[21] Appl. No.: 352,356

[22] Filed: Feb. 25, 1982

[51] Int. Cl.³ .......................... H04N 7/16; H04K 1/02
[52] U.S. Cl. ..................................... 358/118; 358/114; 358/123
[58] Field of Search .................... 358/114, 118, 123

[56] References Cited

U.S. PATENT DOCUMENTS

| | | | |
|---|---|---|---|
| 4,024,575 | 5/1977 | Harney et al. ................. | 358/118 |
| 4,216,500 | 8/1980 | St. Louis ......................... | 358/118 |
| 4,313,133 | 1/1982 | Fukushima .................... | 358/118 |

FOREIGN PATENT DOCUMENTS 841677  7/1960  United Kingdom ............... 358/124

*Primary Examiner*—S. C. Buczinski
*Attorney, Agent, or Firm*—KInzer, Plyer Dorn & McEachran

[57] ABSTRACT

A means for coding and decoding video signals by the application of one of a plurality of available scrambling signals, which scrambling signals have a common frequency but differ in phase, includes means for comparing the brightness level during a predetermined time period of the video signal with the brightness level of the video signal over the succeeding predetermined time period. There are means for changing from one scrambling signal to another if the difference between brightness levels in successive predetermined time periods exceeds a given value.

11 Claims, 3 Drawing Figures

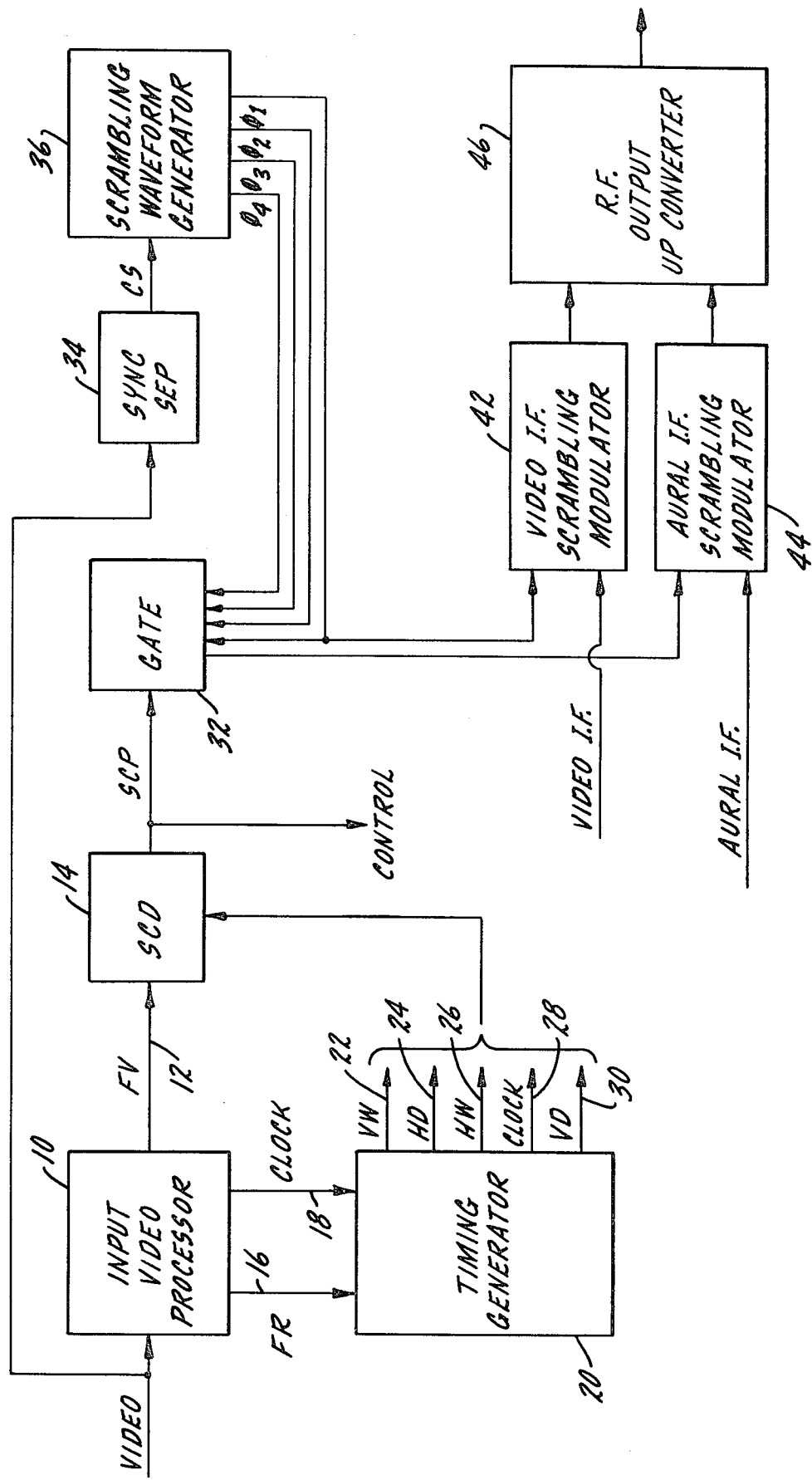

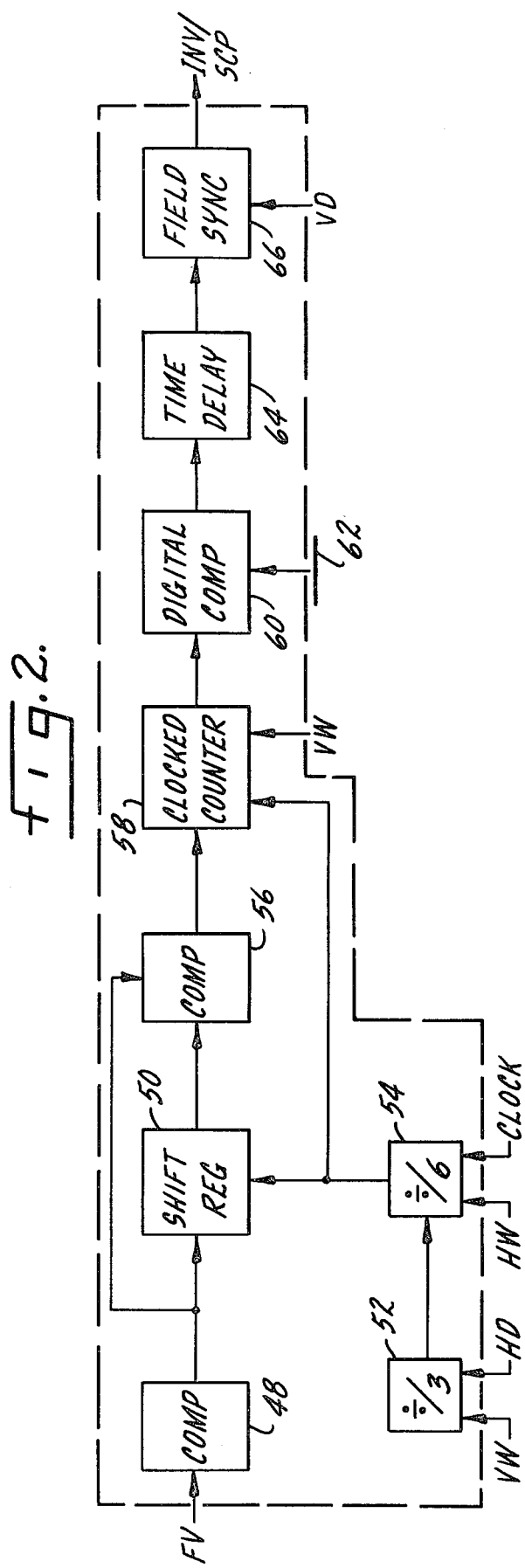

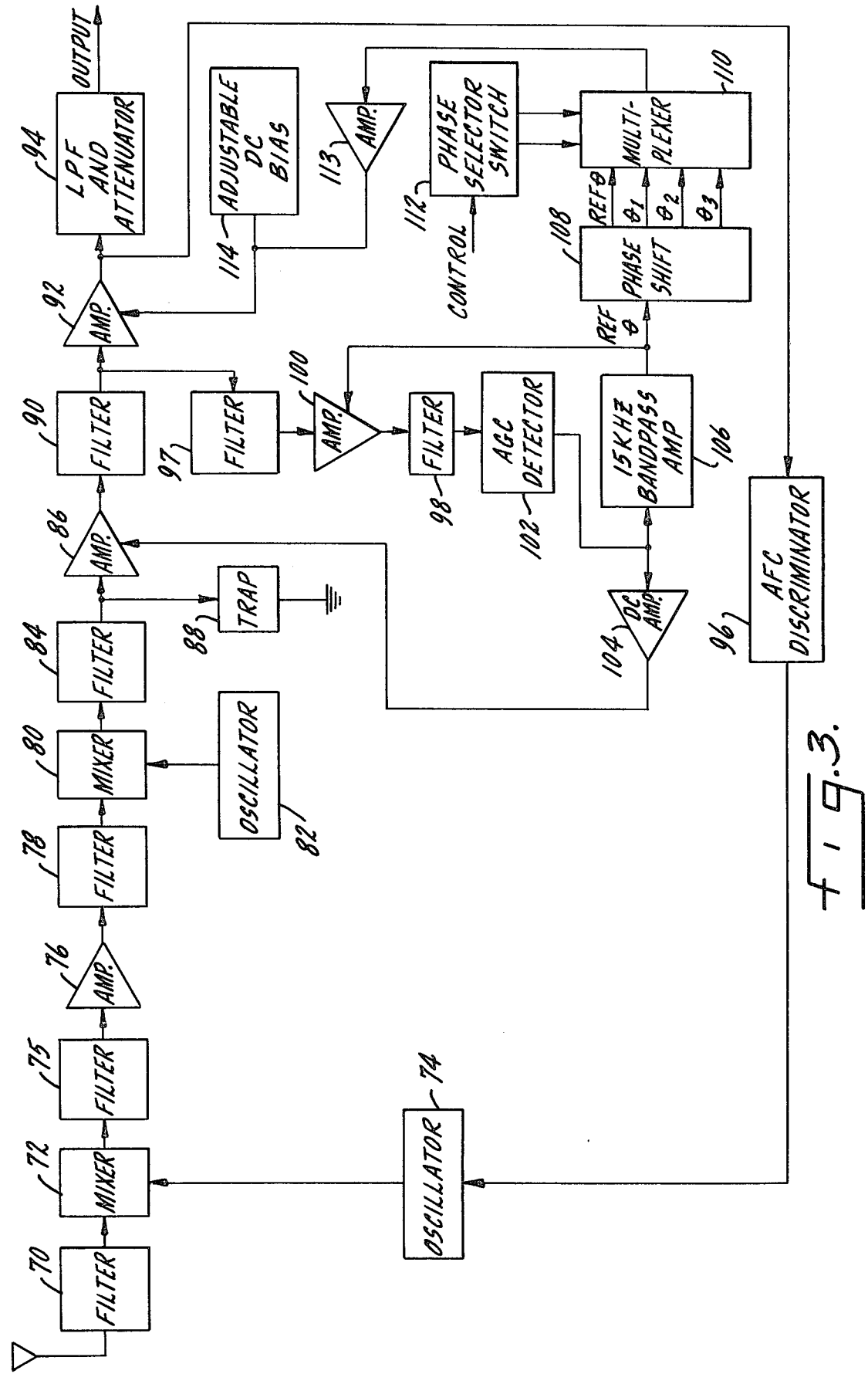

PHASE CHANGE DYNAMIC SCRAMBLING

SUMMARY OF THE INVENTION

The present invention relates to the coding and decoding of video signals and in particular provides a method and apparatus for coding video signals in response to changes in the content or scene of the picture carried by the video signal, referred to in the art as dynamic scrambling.

A primary purpose of the invention is a coding system of the type described in which a plurality of periodic signals are available for scrambling the video signal, which periodic signals have the same or a common frequency, but differ in phase.

Another purpose is a coding system of the type described in which the change from one scrambling signal to another is brought about in response to differences in the video signal brightness level from one predetermined time period to the next.

Another purpose is a video signal coding and decoding process in which the instantaneous brightness level of a video signal is sampled during a predetermined time period and compared with the average brightness value of the video signal over that time period. The thus-formed signal representative of the brightness level of the video signal for a predetermined time period is compared with similar signals for the succeeding and preceding time periods. If the difference in brightness level between successive time periods exceeds a predetermined value, indicative of a scene change in the program carried by the video signal, the phase of the scrambling signal used to code the video signal is changed.

Another purpose is a method of coding video signals in which a plurality of scrambling sine waves, each of identical frequency but differing in phase, with the frequency being related to the video signal horizontal line frequency, are available for use as the coding medium.

Other purposes will appear in the ensuing specification, drawings and claims.

BRIEF DESCRIPTION OF THE DRAWINGS

The invention is illustrated diagrammatically in the following drawings wherein:

FIG. 1 is a block diagram illustrating the coding apparatus described herein,

FIG. 2 is a block diagram illustrating the method for detecting a change in the scene carried by the video signal, and FIG. 3 is a block diagram of a decoder.

DESCRIPTION OF THE PREFERRED EMBODIMENT

The present invention relates to subscription television or the coding and decoding of video signals and has application in cable television systems, over-the-air pay television, commonly called subscription television, and encoded satellite video transmissions. The invention will be specifically described in connection with the coding and decoding of video signals for a cable system.

The invention utilizes an electrical circuit for detecting a change in the scene or a change in the picture carried by the video signal for effecting a change in the specific coding applied to the video signal. Stated another way, when there is a change in the video signal content, the coding mode changes or the specific scrambling signal is changed. Information as to a change in the scrambling signal may be transmitted along with the video signal to the individual subscriber in various ways. For example, the change in scrambling signal may be a control signal included in the vertical interval of the video signal or, specifically, for cable application, such a control signal may be included with a channel classification signal such as illustrated in copending application Ser. No. 104,147, assigned to the assignee of the present application. The specific means for detecting a change in the content of the picture carried by the video signal is illustrated in copending applications Ser. No. 149,708, filed May 14, 1980, and Ser. No. 318,756, filed Nov. 6, 1981, both assigned to the assignee of the present application.

In the present application coding is provided by the application of sine waves in the manner described in U.S. Pat. No. 4,024,575. The patent describes the use of a coding sine wave having a frequency of 15.75 KHz. The present application utilizes a coding sine wave of that frequency with the difference between coding signals being a variation in the phase of the 15.75 KHz sine wave. It should be understood that other periodic waveforms, sine waves or otherwise, may be used; however, such periodic waveforms should have a frequency related to the horizontal line frequency of the video signal. For example, a 31 KHz periodic waveform is satisfactory.

In FIG. 1 the video signal at baseband frequency is applied to an input video processor 10. The processor 10 has a number of outputs, one of which, a filtered video signal (FV) indicated on line 12, is connected to a scene change detector 14 illustrated in FIG. 2. The input video processor also has an output designated frame reference (FR) on line 16 and a clock signal on line 18, which clock signal may have a frequency of 4.0909 MHz. The frame reference signal and the clock signal provide the input for a timing generator 20 which will provide a number of output signals, all synchronized by its two inputs. The output signals are designated vertical window (VW) on line 22, horizontal drive (HD) on line 24, horizontal window (HW) on line 26, a clock signal having a frequency of 4 MHz and indicated on line 28, and a vertical drive signal (VD) on line 30. All of these outputs are connected to scene change detector 14.

The vertical drive signal will be a positive pulse beginning at the first line of the vertical interval and extending to the ninth line of that interval. The vertical window is a positive pulse beginning at line 46 and extending until line 238 of the vertical interval. The horizontal drive and horizontal window signals are each positively directed pulses. The horizontal drive signal begins approximately 2.2 microseconds after the beginning of a horizontal line and ends approximately 8.8 microseconds into a horizontal line. The horizontal window begins approximately 14.8 microseconds into a horizontal line and ends approximately 62 microseconds into a horizontal line.

The output from scene change detector 14 which will be described in detail in connection with FIG. 2, is connected to a gate 32. The input video signal which is connected to the input video processor is also connected to a sync separator 34 whose output, which is composite sync (CS), is connected to a scrambling waveform generator 36. Generator 36 will provide four outputs, each at a frequency of 15.75 KHz and each differing in phase by 90 degrees. The four outputs, designated phase 1-phase 4, are each connected to gate 32, with the phase 1 output also being connected to a video IF scrambling modulator 42.

The output from gate 32 which will be one of the four 15.75 KHz scrambling signals, depending on the particular signal selected by the gate in accordance with the output from scene change detector 14, is connected to aural IF scrambling modulator 44. Modulators 42 and 44 also have an input of the video signal at IF frequency and the aural signal at IF frequency, as described in more detail in the above-mentioned U.S. Pat. No. 4,024,575. Scrambling is accomplished at the IF frequency level, thus both the video and the aural signals at IF frequency are applied to scrambling modulators 42 and 44 and the scrambling sine wave at 15 KHz, and at a particular selected phase, is also applied thereto. As described in the above-mentioned patent, the depth of modulation of the scrambling signals applied to the aural IF signal is somewhat greater than that applied to the video IF signal. The output from video modulators 42 and 44 is applied to an RF output converter 46 which provides the video and aural signals at a specific carrier frequency for a designated television channel.

Scene change detector 14 has an input of filtered video which is essentially bandwidth limited monochrome video which provides the input for a voltage comparator 48. Analog comparator 48 compares the instantaneous brightness of the video signal with the average brightness over a period of time, for example, three frames. The output from comparator 48 is sampled at a rate of 2,048 samples per field and these samples are stored in shift register 50. In fact, the binary video at the output of comparator 48 is sampled at a rate of 32 samples in one out of every three lines over a period of 192 lines in each field.

This sampling process is controlled by timing generator 20. A divide by three circuit 52 is clocked by the horizontal drive and reset by the vertical window. The vertical window in addition to resetting the divide by three circuit, thus insuring the same starting point in every frame, also prevents counting and blocks the output of this circuit during the vertical interval. Thus, divide by three circuit 52 produces a pulse during every third line except during the vertical interval. A divide by six circuit 54 is driven by the 4 MHz clock and reset by divide by three circuit 52 and the horizontal window. Accordingly, the divide by six circuit 54 produces output pulses only every third line and only during the horizontal window. Since the horizontal window lasts for 192 clock pulses and divide by six circuit 54 produces one output pulse for every six clock pulses, there are 32 sample pulses every third line except during the vertical interval.

A digital comparator 56 is connected to the output of shift register 50 and compares the output binary number from shift register 50 with the output binary number from comparator 48. Thus, the brightness level of one field is compared with the brightness level of the preceding field at each of the same locations in the field. The output from digital comparator 56 which will be either high or low, depending on whether the brightness levels are the same or different, is connected to a clocked counter 58. Counter 58 receives the output from divide circuits 52 and 54 and thus is clocked at the same rate as shift register 50. Clocked counter 58 will count pulses at the described sample rate when the comparator output from circuit 56 is high indicating dissimilar inputs. Thus, whenever there is a difference in the brightness levels from one field to the next, that indication of a brightness change will be registered by clocked counter 58. The counter is reset by the vertical drive signal so that a new count begins for each field. Clocked counter 58 is connected to a digital comparator 60 which has a preset number, as provided by a series of manual switches diagrammatically indicated at 62. Thus, the threshold for recognition of a scene change can be varied. The number from clocked counter 58, when it exceeds the number provided by preset switches 62 is indicative of a scene change as there have been a sufficient number of changes in the brightness level from one field to the next to indicate a scene change.

The output from digital comparator 60 is a pulse indicating that in fact a scene change has taken place and this pulse is connected to a time delay 64. Time delay 64 may typically have a three second period and thus will not register a new scene change unless three seconds have elapsed. In this way, fast moving objects or the like will not trigger a change in coding mode. Time delay circuit 64 is connected to a field sync circuit 66 which is gated by the vertical drive signal from timing generator 20. Thus, a scene change, which will cause a change in coding mode of the video signal as described, will only take place at the end of a field and such change in coding mode will not take place at a greater frequency than every three seconds. The scene change detector output of field sync 66 is connected to gate 32, as described above. The output of the scene change detector will also be used to provide a control signal for decoding, which control signal may be positioned in the vertical interval of the video signal as disclosed in application Ser. No. 149,708.

To summarize the operation of the coding system, as described herein, the coding signal is a 15 KHz sine wave with the phase relationship between the sine wave applied to the video signal and the aural signal being variable. Specifically, as illustrated in the above-mentioned U.S. patent, the sine wave applied to the video signal and the aural signal will be 180 degrees out of phase so that the sine wave applied to the aural signal, when detected, may be appropriately used for decoding. That is one coding relationship as described herein. Other possible coding modes have the video and aural scrambling sine waves in phase or differing by 90 degrees or 270 degrees. In each case, the change from one coding sine wave to another is brought about in accordance with a detected change in the brightness level of the video signal, indicating a change in the picture portrayed by the video signal. The change in brightness level is detected or determined by the scene change detector as described and the threshold for determining when a particular change in scene has taken place may be varied. There can only be a change in the scrambling signal at the end of a field or between fields. This is important as a change in coding mode or a change in scrambling signal may be visible to the viewer as the form of decoding residual visible on the television screen will vary with the phase of the coding signal. However, if the change in scrambling signal is concurrent with a change in the scene, the viewer will not notice a change in the residual coding, if it is noticeable at all. Thus, the dynamic scrambling concept as disclosed herein changes the scrambling signal at a point in the video signal which makes it essentially unobservable to the normal television viewer.

Gate 32 is effective to cause a change in the scrambling signal. As described, there are four scrambling signals, each differing in phase by 90 degrees. In one form, each time there is a signal from the scene change detector, gate 32 will advance to the next scrambling signal in sequence. In another form of the invention, the change from one scrambling signal to another or the change in phase of the scrambling signal applied to the aural carrier, as opposed to the scrambling signal applied to the video carrier, may be on a random basis. What is important is that there be a change in the phase relationship between the signals applied to the video and aural carriers and whether or not this change is sequential or random, or otherwise, is not particularly important. In this connection, although the invention has been described in connection with a change in phase of approximately 90 degrees, it could be otherwise. The change in phase may be smaller or greater. In addition, along with the change in phase, there may be a change in the frequency of the scrambling wave form, for example from 15 KHz to 31 KHz, as described in copending application Ser. No. 318,756. Thus, there may be several signals of differing phase and common frequency providing one group of scrambling signals and there may be a second group, at a different frequency, related to the horizontal line frequency, but again with differing phase.

FIG. 3 illustrates a decoding apparatus and is specifically a cable television converter of the type illustrated in the above-mentioned U.S. patent and U.S. Pat. No. 3,333,198. The incoming signal from a cable system passes through an input filter 70 which is connected to a first mixer 72. A variable oscillator 74 is connected to mixer 72.

The output from mixer 72 is directed to a filter 75 which in turn is connected to an amplifier 76. Amplifier 76 is connected to a second filter 78 and to a second mixer 80. A fixed local oscillator 82 is connected to mixer 80, with the output from the mixer being a television channel frequency nomally unused in the particular area. Input filter 70 receives a wide spectrum of cable channels, as many as 35-56 are conventionally used in CATV systems. Variable oscillator 74 is used to select a particular channel desired by the subscriber, with oscillator 82 converting the selected channel to a predetermined VHF channel, again normally a channel not locally used as a broadcast channel in the area, but one which can be received on a conventional television receiver. Thus, all channels in the cable can be shown on a particular TV receiver and on a normally unused channel, for example channel 3.

The output from mixer 80 is connected to a filter 84 with the output from the filter being connected to an RF amplifier 86. A trap 88 normally used to remove the video signal of the next highest channel is connected between filter 84 and amplifier 86. The output from amplifier 86 is connected to a filter 90 with the filter output being connected to a second RF amplifier 92. The output from RF amplifier 92 is connected to a low pass filter and attenuator 94 which in turn will be connected to the input of a television receiver. An AFC discriminator 96 is connected to the output of amplifier 92 and is used to maintain frequency at the output of oscillator 74, as is conventional.

The output from filter 90, which is both scrambled audio and scrambled video, is connected to an audio or aural bandpass filter 97. A second aural bandpass filter 98 is separated from filter 97 by an amplifier 100. The output from filter 98 is connected to an AGC detector 102 which provides inputs for a DC amplifier 104 and a 15 KHz bandpass amplifier 106. The output from amplifier 104 is connected to decoding amplifier 86 and provides an appropriate DC level for the audio and video signals consistent with the dynamic range of the system.

The output from 15 KHz bandpass amplifier 106 provides one input for amplifier 100 and provides a reference phase input for a phase shift circuit 108. The reference signal to amplifier 100 is used to stabilize the phase of the descrambling signal and with the combination of amplifiers 100 and 106, filter 98 and AGC detector 102 provides a closed loop to control phase of the descrambling signal.

Phase shift circuit 108 is effective to provide four outputs of a 15 KHz signal, but each of differing phase, with the difference in phase being 90 degrees as described in the preferred embodiment. The four phase variant 15 KHz signals are supplied to a multiplexer 110. A phase selector switch 112 receives a control input which is one of the outputs from the scene change detector 14 of FIG. 1, which control input provides an indication that there has in fact been a change in phase of the coding signal and thus there should then be an appropriate change in phase of the decoding signal. The control input to the phase selector switch will cause this switch to select the appropriate phase output from multiplexer 110. The output from multiplexer 110 is supplied to an amplifier 113 which provides the decoding signal for amplifier 92 as described in the above-mentioned U.S. patent. An adjustable DC bias circuit 114 is used to precisely control the DC level of the applied decoding signal.

In the encoding portion of the system, the phase of the scrambling signal applied to the video is unchanged with the phase of the scrambling signal applied to the aural carrier being variable. In decoding, the phase of the signal on the aural carrier is used as the reference and an appropriate phase change for the video decoding signal is selected by phase selector switch 112. The actual signal used to decode the scrambled video must be 180 degrees out of phase with the video scrambling signal in order for decoding to take place. The control input, the phase selector switch and the multiplexer combine to provide an appropriate decoding signal in accordance with the detected phase of the coding signal applied to the aural carrier.

Whereas the preferred form of the invention has been shown and described herein, it should be realized that there may be many modifications, substitutions and alterations thereto.

The embodiments of the invention in which an exclusive property or privilege is claimed are defined as follows:

1. Means for coding video signals by the application of one of a plurality of available scrambling signals, which scrambling signals have a common frequency, but differ in phase, including means for comparing the brightness level during a predetermined time period of the video signal with the brightness level of the video signal over the succeeding predetermined time period, and means for changing from one scrambling signal to another if the difference in brightness levels between successive predetermined time periods exceeds a given value.

2. The coding means of claim 1 further characterized in that said scrambling signals are sine waves having a frequency related to the horizontal line frequency of the video signal.

3. The coding means of claim 1 further characterized by and including means for preventing a change from one scrambling signal to another except at certain predetermined portions of the video signal.

4. The coding means of claim 1 further characterized in that the difference in phase between said plurality of available scrambling signals is on the order of about 90 degrees.

5. Apparatus for coding video signals by the application of one of a plurality of available scrambling signals, which scrambling signals have a common frequency but differ in phase, including:
(a) means for detecting a change in the picture scene carried by the video signal including means for providing a signal representing the brightness level of a video signal during a predetermined time period of said signal, which time period includes a video field, including means for comparing the instantaneous brightness level at successive subdivisions of said time period, each less than a single horizontal line of the video signal, with an average brightness level,
(b) means for comparing the representative signal of one time period with the representative signal of an adjacent time period,
(c) means for changing from one scrambling signal to another when the difference between successive representative signals exceeds a predetermined value, and
(d) means for preventing a change from one scrambling signal to another only during a vertical interval of the video signal.

6. The apparatus of claim 5 further characterized in that said scrambling signals are periodic and have a frequency which is related to the video signal horizontal line frequency.

7. Means for coding video signal by the application of one of a plurality of available scrambling signals, which scrambling signals differ in phase, but have a common frequency which is related to the video signal horizontal line frequency, including means for determining the existence of a change in the picture scene carried by the video signal, and means for changing from one scrambling signal to another upon detection of such a scene change.

8. Means for decoding a video signal coded by the application of one of a plurality of available scrambling signals, which scrambling signals have a common frequency, but differ in phase, and in which the scrambling signal is changed in accordance with changes in the brightness level of the video signal, including means for detecting a change in the scrambling signal, and means for changing the decoding signal in response to detection of a change in the scrambling signal.

9. The decoding means of claim 8 further characterized in that said scrambling signals are related to the horizontal line frequency of the video signal.

10. Means for decoding a video signal coded by the application of one of a plurality of available scrambling signals, which scrambling signals differ in phase, but have a common frequency which is related to the video signal horizontal line frequency, and in which the scrambling signal is changed in accordance with changes in the picture scene carried by the video signal, including means for detecting a change in the scrambling signal, and means for changing the decoding signal in response to detection of a change in the scrambling signal.

11. Means for decoding a video signal coded by the application of one of a plurality of available scrambling signals, which scrambling signals have a common frequency but differ in phase, and in which the scrambling signal is changed in response to a detected change in the picture scene carried by the video signal, by determining the difference in brightness level between successive predetermined video signal time periods exceeding a given value, which time periods include a video signal field, with the brightness level being determined by comparing the instantaneous brightness level at successive subdivisions of said time period, each less than a horizontal line, with an average brightness level, and with the change in scrambling signal being permitted only during a vertical interval of the video signal, including means for detecting a change in the scrambling signal, and means for changing the decoding signal in response to detection of a change in the scrambling signal.

* * * * *